UNITED STATES PATENT OFFICE.

CHARLES F. BONHACK, OF NEW YORK, N. Y.

ARTIFICIAL FUEL AND PROCESS FOR MAKING THE SAME.

948,812.     Specification of Letters Patent.     Patented Feb. 8, 1910.

No Drawing.     Application filed October 5, 1909. Serial No. 521,107.

*To all whom it may concern:*

Be it known that I, CHARLES F. BONHACK, a citizen of the United States, and a resident of the city of New York, borough of the Bronx, in the county and State of New York, have invented a new and Improved Artificial Fuel and Process for Making the Same, of which the following is a full, clear, and exact description.

This invention relates to artificial fuel, and particularly to fuels of this kind which are formed from small sizes of coal or from coal dust which is incorporated with a binder, so as to form lumps or briquets which can be conveniently burned upon a grate.

My process is particularly applicable to buckwheat coal No. 2, coal dust, rice or barley coal. It has frequently been attempted heretofore to produce an artificial fuel from coals of this kind, by mixing the same with an adhesive binder, but the high prices of substances which could be used as a binder have rendered them prohibitive, and for this reason such substances have not come into general practical use. I have discovered a substance which is manufactured as a by-product in large quantities, and which is an admirable substance when used as a binder, as suggested. This substance is produced in great quantities and can be procured at a low cost.

The invention resides in the process to be described hereinafter, and in the artificial fuel produced according to the process as hereinafter set forth in the claims.

In carrying out my process I procure quantities of small sizes of coal, or of coal dust, as suggested above, and with this coal I mix thoroughly a substance known as glutrin. This substance glutrin is a by-product of the sulfite wood pulp process. It is an extremely adhesive, thick fluid, having about the consistency of heavy molasses. I obtain the best results by mixing six pounds of glutrin with one hundred pounds of coal, and the mixture should be thoroughly stirred so as to produce a thorough mechanical mixture. After the glutrin has been thoroughly mixed into the coal, as described, I add about three pounds of hydraulic cement which has been previously mixed with water. The object of the cement is to form a coating over the small particles of the coal, and this coating of course deposits over the glutrin, and the function of the cement is to form a substantially waterproof coating or protector for the glutrin. This renders the artificial fuel substantially impervious to the action of moisture. On account of the fact that the cement is intended to form a coating, it should be noted that the mixing should take place in the order stated, that is, the glutrin should be mixed with the coal first. This substance, glutrin, can be obtained in the open market for approximately fourteen cents per gallon. It is extremely adhesive, and sufficiently fluid to enable it to be mixed readily with the finely divided coal. The extremely low cost of the glutrin, and the fact that it has heretofore been a waste product, renders it an extremely valuable agent for this purpose, and enables an artificial fuel of great value to be produced at low cost. After the glutrin and cement have been mixed with the coal in the manner suggested, the coal may be placed upon a platform and permitted to dry in the form of lumps or in briquets. I prefer, however, to form the artificial fuel into irregular lumps, as this form will burn with greater efficiency for the reason that interstices or air spaces are formed throughout the entire mass of fuel. This gives a better draft.

Having thus described my invention, I claim as new and desire to secure by Letters Patent,—

1. An artificial fuel, composed of a finely divided combustible, glutrin, and a cementitious material.

2. The process of making artificial fuel, which consists in incorporating glutrin with coal dust or coal grains so as to form an adhesive coating on the particles of coal, mixing cement thereafter with the coal to form a protective coating over said glutrin, and thereafter drying the mixture.

In testimony whereof I have signed my name to this specification in the presence of two subscribing witnesses.

CHARLES F. BONHACK.

Witnesses:
F. D. AMMEN,
PHILIP D. ROLLHAUS.